United States Patent Office 3,679,509
Patented July 25, 1972

3,679,509
PROCESS FOR SEALING LAMINATED MATERIALS
Josef Frans Fielibert, Zevenaar, Netherlands, assignor to Lever Brothers Company, New York, N.Y.
Filed Dec. 23, 1969, Ser. No. 887,660
Claims priority, application Great Britain, Dec. 24, 1968, 61,348/68
Int. Cl. B32b *31/20*
U.S. Cl. 156—182        5 Claims

ABSTRACT OF THE DISCLOSURE

A method of sealing laminated materials, particularly as used in food containers, in which a jaw shape is used which causes the contacting sealable layers to rupture along a parting line and then form heat seals on each side of the parting line, so giving a double seal of improved reliability.

---

The invention relates to a process for sealing laminated sheet materials of the kind having an inner or contact layer of heat-sealable material and an outer layer of material possessing relative mechanical strength and having a softening point higher than the heat-sealable material.

It is an object of the invention to provide a process for sealing laminated materials of the kind specified in such a manner that a reliable heat-seal is obtained which is as bacteria-tight as possible, even if the surfaces to be sealed are soiled, e.g. by particles of a foodstuff.

Another object of the invention is to provide a process for sealing sheet materials which may form containers for foodstuffs which are thereby sealed in as reliable and bacteria-tight a manner as possible.

According to the invention there is provided a process for heat sealing laminated sheet material of the kind having an outer layer of material possessing mechanical strength and an inner layer of heat-sealable material, the process comprising the steps of superposing, at a pre-determined sealing zone, a pair of said sheets with the said inner layers in contact,
applying heat and pressure by heat sealing means to said superposed sheets at said sealing zone so that each inner layer ruptures along a parting line within said sealing zone,
and effecting, within said sealing zone, two heat seals between the contacting layers, one on each side of the parting line.

As a result of this process, two separate heat-seals are obtained, which between them tend to envolp any particles of soil which might have been present on the surfaces of the heat-sealable layers pressed together. Also owing to the fact that two separate heat-seals are obtained, a crack which may occur in one of these seals has no tendency to continue into the other heat-seal, and, moreover, local weaknesses are minimised.

According to a preferred embodiment of the invention the laminated materials comprise an outer layer of metal foil and a contact layer of thermoplastic material. When the laminated materials are intended for packing foodstuffs, excellent results are obtained with polypropylene-coated aluminium foil.

The invention is particularly useful when carried out with permanently heated sealing jaws. It is well known that the use of permanently heated sealing jaws allows the sealing operations to take place rapidly and economically. Although the heat-seals effected with permanently heated jaws are not cooled down to the temperature at which the heat-seals harden, it appears that on heat-sealing a cover to a container in which air is present, with the process of the invention the seals have little or no tendency to fail when the jaws are removed, even if a superatmospheric pressure is generated in the container by heated air. This is of particular importance when such containers have to be sterilised by some form of thermal treatment.

In carrying out the process of the invention, it is preferred to use sealing jaws of which at least one has a profile, such that a central zone projects from the sealing face of that jaw towards the other jaw. Preferably the sealing face of said jaw is V-shaped the counterjaw having a flat sealing face and the arms of the V enclosing an obtuse angle.

Favourable results are obtained when said V is symmetrical with regard to the flat sealing face of the counterjaw. Very good results are obtained when, depending on thickness and nature of the materials to be sealed, said angle is from 150° to 170°. Excellent results are obtained with such a set of jaws when the said obtuse angle is 164°, particularly when sealing polypropylene coated aluminium foil food containers.

The invention will now be described in detail with reference to the drawing showing, by way of example, the process of sealing a cover to a container for foodstuffs.

Figure 1:
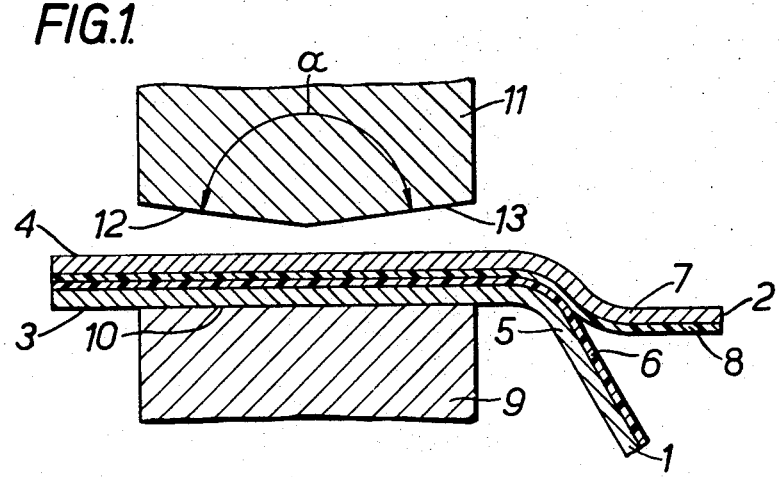
FIG. 1 is a sectional view of the upper rim portions of a flanged tube-like container for foodstuffs with the cover prior to the sealing operation, showing the sealing jaws also in section.

The container shown in FIG. 1 consists of a tub-like receptacle 1 formed from sheet material and closed by a cover 2. The upper rim of the receptacle 1 is provided with a flange 3 to which a corresponding flange 4 of cover 2 is to be heat-sealed. The material of the receptacle is a laminate of an outer layer 5 of a material having substantial mechanical strength and of a heat-sealable inner layer 6. The material of cover 2 is a similar composition of an outer layer 7 having relative mechanical strength and of a heat-sealable inner layer 8. The sealing jaws consist of a lower jaw 9 having a flat sealing face 10 and of an upper profiled jaw 11 having two sealing faces 12 and 13 which in section form a V and which enclose an angle $\alpha$ and are symmetrically disposed with respect to the flat sealing face 10. In the embodiment shown the angle $\alpha$ is 164°.

When cover 2 is applied to receptacle 1 and the filled container is positioned with its flange between heated jaws 9 and 11, upper jaw 11 is lowered to such an extent that laminated materials 5, 6 and 7, 8 are compressed. Heat conducted by layers 5 and 7 melts the sealable material of layers 6 and 8 at a pre-determined sealing zone between jaws 9 and 11, which zone gradually broadens as the compression and heat is maintained. Compression is maintained until, owing to the capillary action, the molten material of layers 6 and 8 retracts from the centre of the zone (FIG. 2) to rupture along a parting line at the centre and form heat-seals 14 and 15 on each side of this parting line. Particles 16 of soil which might be present between layers 6 and 8 are fully enveloped by the molten material thereof during its retracting movement. It should be noted moreover that the capillary flow of material apparently has no adverse effect on the seals formed, whereas in conventional sealing methods such capillary movement would tend to provide zones of weakness in the seal.

Figure 2:
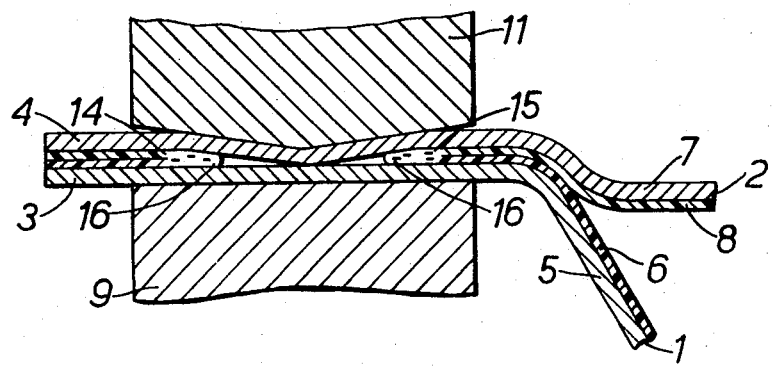
FIG. 2 is an identical view during the sealing operation.

The two cavities at the centre of the material as shown in FIG. 2 (which are enclosed by the layers 5 and 7 and the heat-seals 16) appeared from microscopic examination to have been filled by the distorted laminating agent, formerly present in the form of very thin layers in respect to the layers 5 and 6 and 8 and 7 respectively and used for bonding the latter. Although in FIG. 2 the outer layers 5 and 7 have been shown to be in contact at the central parting line no real contact occurs between said layers. Even under relatively high pressure some laminating agent will remain between these outer layers at the parting line.

When the sealing jaws subsequently are moved away from each other, cover 2 remains heat-sealed to receptacle 1 in a bacteria-tight manner. Excellent results have been obtained with the packing of foodstuffs, such as fish with tomato sauce, in tub-like containers of which the receptacle as well as the cover consists of polypropylene coated aluminium foil. In this instance the aluminium foil had a thickness of $50\mu$ and the polypropylene coating also had a thickness of $50\mu$.

The angle $\alpha$ between the sealing faces 12 and 13 respectively of the upper jaw was 164° and these faces were symmetrically disposed. The mean pressure between the jaws was kg./cm.² for the area to be sealed, which pressure was maintained during 1.5 seconds. The temperature of the upper jaw was 225° C. and of the lower jaw 200° C. Even if the flange of the receptable was soiled with the foodstuff to be packed, reliable heat-seals were obtained which were absolutely bacteria-tight.

What is claimed is:

1. A process for closing an opening in a container by forming a seal having two substantially parallel heat-seal spaced apart sealing lines, the container comprising two superposed heat sealable laminated sheets having an outer layer of metal foil and an inner layer of heat-sealable material, comprising the steps of:
   applying heat and pressure to said superposed sheets at a predetermined sealing zone by heat sealing means comprising a pair of heat sealing jaws, at least one of which has a profile such that a central zone projects from a sealing face of that jaw towards the other jaw, so that each inner layer ruptures along a parting line within said sealing zone, and effecting, within said sealing zone, two spaced apart substantially parallel heat seals between the contacting layers, one on each side of the parting line, while leaving the two outer layers of motel foil intact.

2. A process as claimed in claim 1, in which said laminated sheets are polypropylene-coated aluminium foil.

3. A process as claimed in claim 1 in which the said jaw profile is V-shaped, the arms of the V enclosing an obtuse angle.

4. A process as claimed in claim 3, in which the angle of said jaw profile is between 150° and 170° and the opposing jaw is fat.

5. A process as claimed in claim 4, in which said jaw profile is 164°.

References Cited

UNITED STATES PATENTS

| | | | |
|---|---|---|---|
| 2,866,488 | 12/1958 | Thompson | 156—290 X |
| 3,294,615 | 12/1966 | Long | 156—537 |
| 3,409,494 | 11/1968 | Korzinek | 156—515 |
| 3,007,835 | 11/1961 | Rosenberg et al. | 156—251 |
| 3,123,210 | 3/1964 | Hermanson et al. | 156—333 X |
| 2,184,140 | 12/1939 | Cunnington | 156—251 X |
| 2,430,920 | 11/1947 | Dodge | 156—182 X |

CARL D. QUARFORTH, Primary Examiner

E. A. MILLER, Assistant Examiner

U.S. Cl. X.R.

53—39; 99—171 S, 171 LP; 156—69, 222, 223, 288, 309